United States Patent [19]

Zecher

[11] 4,014,814

[45] Mar. 29, 1977

[54] CORROSION INHIBITOR COMPOSITION

[75] Inventor: David C. Zecher, Wilmington, Del.

[73] Assignee: Hercules Incorporated, Wilmington, Del.

[22] Filed: July 30, 1975

[21] Appl. No.: 600,755

[52] U.S. Cl. .......................... 252/389 A; 252/393; 21/2.7 A

[51] Int. Cl.² .................. C09K 3/00; C23F 11/00

[58] Field of Search ............ 252/389 A, 387, 393, 252/180, 181; 21/2.7 R, 2.7 A

[56] References Cited

UNITED STATES PATENTS

| | | | |
|---|---|---|---|
| 2,629,693 | 2/1953 | Barton | 252/393 |
| 2,799,654 | 7/1957 | Sabol | 252/393 |
| 2,810,697 | 10/1957 | Cantrell | 252/393 |
| 3,277,120 | 10/1966 | Fullhart | 252/393 |
| 3,364,149 | 1/1968 | Morgenthaler | 252/393 |
| 3,518,203 | 6/1970 | Savinelli | 252/181 |
| 3,580,855 | 5/1971 | Mickus | 252/181 |
| 3,687,610 | 8/1972 | Gilson | 21/2.7 |

*Primary Examiner*—Samuel W. Engle
*Assistant Examiner*—Donald P. Walsh
*Attorney, Agent, or Firm*—Michael B. Keehan

[57] ABSTRACT

A composition for use as corrosion inhibitor in circulating water streams includes a linear water-soluble, phenol-aldehyde resinous condensation product and a polyphospate, such as an alkali metal polyphosphate or a phosphorylated polyol.

14 Claims, No Drawings

CORROSION INHIBITOR COMPOSITION

The present invention relates to a composition which, when added to water systems, reduces the corrosion of ferrous metal surfaces in contact with the water. More particularly it relates to a composition and method for inhibiting corrosion of ferrous metal surfaces which are in contact with flowing or circulating water streams, such as those used in cooling water systems or evaporators for aqueous solutions.

Among the most effective and widely used corrosion inhibitors at present are formulations based on chromium compounds in the hexavalent oxidation state, for example, the chromates and dichromates of sodium, potassium and zinc. However, chromium-based inhibitors have several disadvantages, among the most serious of which are toxicity, staining and incompatibility with reducing agents, such as hydrogen sulfide and sulfur dioxide, often present in the air drawn through cooling towers. Recently there has been a substantial increase in demand for nonchromate, nontoxic corrosion inhibitors.

Among the nonchromate, nontoxic corrosion inhibitors proposed are certain linear, water-soluble phenol-aldehyde resinous condensation products. However, at the dosage level required for effective corrosion inhibition, water-soluble phenolic resins are relatively expensive. The addition of certain inorganic metal salts, particularly zinc salts, permits somewhat lower dosage levels to be used. Another class of nonchromate non-toxic corrosion inhibitors is the polyphosphates, which include inorganic polyphosphates and polyfunctional acid phosphate esters of polyols, more commonly referred to as phosphorylated polyols. It has now been found that water-soluble polyphosphates synergistically increase the corrosion inhibition properties of the water-soluble phenolic resins. This permits substantially lower dosage levels of the relatively expensive water-soluble phenolic resins to be used in aqueous systems to inhibit corrosion of ferrous metal surfaces in contact with the system.

Accordingly, this invention comprises a corrosion inhibiting composition for water systems which comprises:
  a. a water-soluble phenolic resin prepared by reacting an aldehyde with a phenol, having the ortho and/or para position blocked, and
  b. a polyphosphate selected from the group consisting of inorganic polyphosphates and phosphorylated polyols.

The term synergistic is used herein in its usual sense to mean that the reduction in corrosion under a given set of circumstances using the combination of the present invention is substantially greater than the sum of the corrosion reduction obtained using the phenolic resin above plus that obtained using the polyphosphate alone.

Water-soluble phenolic resins employed in this invention are disclosed in U.S. Pat. No. 3,687,610. The phenolic resins are formed by reaction of an aldehyde and a phenol having the ortho and/or para position blocked. Suitable aldehydes have the formula

(I)

wherein R is selected from the group consisting of hydrogen and lower aliphatic groups having less than 5 carbon atoms. Illustrative examples of such aldehydes are formaldehyde, acetaldehyde and propionaldehyde.

Phenols used in the preparation of the water-soluble phenolic resins are phenols having the general structural formula

(II)

wherein $n$ is 1–3 and each X is in the ortho or para position and is independently selected from the group consisting of —OH, —COOH, hydrogen, —SO$_3$H, —NH$_2$ and alkyl and alkylene radicals having up to 8 carbon atoms. Illustrative examples of such phenols are o-hydroxybenzoic acid, 2,4,6-trihydroxybenzoic acid, p-dihydroxybenzene, 2,4-dihydroxybenzoic acid and 3,4,5-trihydroxybenzoic acid.

Condensation reaction between aldehydes and phenols generally takes place through the ortho and/or para positions. Since the phenols used to prepare the water-soluble phenolic resins for use in this invention are blocked at the ortho and/or para positions, the phenolic resin produced will be essentially linear. The mole ratio of phenol to aldehyde is about 1.0:1.5 to 2.0:0.5. A preferred mole ratio is 1.2:0.8.

Catalysts used to promote the condensation reaction are well known in the art, for example see *The Chemistry of Synthetic Resins*, by Ellis, Volume 1, 1935, Chapter 16. Examples of suitable catalysts are sulfuric acid, sodium hydroxide, formic acid, ammonia, trimethylamine, sodium carbonate and hydrochloric acid. The temperature at which the reaction is carried out is suitably from about 10° to about 100° C.

The essentially linear, water-soluble phenol-aldehyde resins are normally referred to as intermediate condensation products. They are of low to moderate molecular weight and can be of the resol or novolak type. The resol type results from reaction of excess aldehyde with phenol in the presence of a basic catalyst. A preferred ratio of aldehyde to phenol in preparing resol type resins is 1.5:1. Molecular weights of water-soluble resol type resin are about 300–700. The novolak type results from reaction of less than equivalent amounts of aldehyde with phenol in the presence of an acid catalyst. A preferred ratio of aldehyde to phenol in preparing novolak type resins is 0.8:1. Molecular weights of water-soluble novolak type resins are about 1200–1500. Water-soluble dimer, trimer or oligomer products prepared by phenol aldehyde condensation reaction can also be used in the synergistic compositions of this invention. Phenol-aldehyde resins which have been bisulfited can also be employed in this invention. The sulfuric acid group may be introduced in various ways, for example, sulfonation of the phenol prior to its reaction or sulfonation of the phenol-aldehyde resins subsequent to reaction.

Polyphosphates used in the practice of this invention are selected from the group consisting of
  1. an inorganic polyphosphate having a molar ratio of at least one of alkali metal oxide, alkaline earth metal oxide, zinc oxide to P$_2$O$_5$ of about 0.4/1–2/1, and their corresponding acids having a molar ratio of water to $P_2O_5$ of about 0.4/1–2/1, and 2. a polyfunctional acid phosphate ester of a polyhydric alcohol, said ester having the formula R—(OPO$_3$H$_2$)$_x$ wherein R is any remaining organic residue of a polyhydric alcohol used as the starting material and $x$ is a number from 2–6, said esters being referred to in this specification including claims as phosphorylated polyols.

Illustrative examples of polyhydric alcohols are glycerol, polyglycerol (dimer, trimer, tetramer, etc.), pentaerythritol, dipentaerythritol, 2,5-hexanediol, 1,2,6-hexanetriol, polyvinyl alcohols whose 4% aqueous solutions are in the viscosity range of 2 to 25 centipoises, trimethylolethane, trimethylolpropane, 1,2-propanediol, ethylene glycol, diethylene glycol, sucrose and low molecular weight phenolic novolaks.

Application water-soluble inorganic polyphosphates include, for instance, any of the water-soluble glassy and crystalline phosphates, e.g., the so-called molecularly dehydrated phosphates of any of the alkali metals, alkaline earth metals, and zinc, as well as zinc-alkali metal polyphosphates and mixtures thereof. Included also are the acids corresponding to these polyphosphate salts, e.g., pyrophosphoric acid ($H_4P_2O_7$) and higher phosphoric acids having a molar ratio of water to $P_2O_5$ of about 0.4/1–2/1. Illustrative examples of inorganic polyphosphates include the pyrophosphates, such as tetrapotassium pyrophosphate and pyrophosphoric acid, the tripolyphosphates, such as sodium tripolyphosphate, the hexametaphosphates, such as sodium hexametaphosphate.

Phosphorylated polyols of the type used in this invention are disclosed in U.S. Pat. No. 3,580,855. A number of processes are known in the art for preparing the phosphorylated polyols. A preferred process is to react polyphosphoric acid with a polyol. The polyphosphoric acid should have a $P_2O_5$ content of at least about 72%, preferably about 82 to 84%. A residue of orthophosphoric acid and polyphosphoric acid remains on completion of the reaction. This residue may be as high as about 25–40% of the total weight of the phosphorylated polyol. It may either be removed or left in admixture with the phosphorylated polyol. Preferably the phosphorylated polyols produced by this process are prepared employing amounts of a polyphosphoric acid having about 0.5–1 molar equivalents of $P_2O_5$ for each equivalent of the polyol used. Larger amounts of polyphosphoric acid can be used if desired.

By "equivalents of the polyol" is meant the hydroxyl equivalents of the polyol. For example one mole of glycerol is three equivalents thereof, one mole of pentaerythritol is four equivalents thereof, and so forth. The phosphorylated polyols can be partially or completely converted to their corresponding alkali metal salts or ammonium salts by reacting the phosphorylated polyols with appropriate amounts of alkali metal hydroxides or ammonium hydroxide.

In the composition of this invention, the ratio of water-soluble phenolic resin to polyphosphate can be from about 5:1 to about 1:5 and is preferably from about 3:1 to about 1:3. A particularly preferred ratio is 1:1.

The total amount of the corrosion inhibitor composition of this invention employed in a particular water system is dependent upon the corrosiveness of the system which in turn is dependent upon many factors such as temperature, pH, flow rate and hardness. In general, after initial pretreatment at relatively high inhibitor dosages for several days, a total maintenance dosage of about 5 to about 100 ppm. of the composition provides adequate protection from corrosion. In many uses maintenance dosages of about 10 to about 30 ppm. are preferred. These components of the synergistic corrosion inhibitor composition can be added separately or in combination, slugwise or continuously, in bulk or solution form and as the acid or alkali metal salt. It is preferred that a dilute solution of the two components in the form of their partial sodium salts be added simultaneously by a continuous feed. If desired, the composition of this invention can be combined with other water treatment compositions or corrosion or scale inhibitors to reduce costs, lower dosage requirements, or to provide additional benefits, for example, the dispersion of solids in the system.

For convenience in shipping, storage, and dilution, and to insure maintenance of the desired ratio of water-soluble phenolic resin to polyphosphate, it is often desirable to prepare concentrates of the components in the proportions to be employed. Thus, addition of a single additive solution, with or without further dilution with water, is possible. Such concentrates can be prepared using as the solvent and viscosity control agent either water or lower alcohols including but not limited to methanol, ethanol, isopropanol, butanol, or a combination of water and lower alcohol.

The following examples illustrate the effectiveness of typical compositions of the present invention. In these examples all parts and ratios are by weight.

The compositions are evaluated under simulated cooling tower conditions in both short-term (20 hours) and long term (14 days) tests. The test solution is a synthetic cooling water of medium hardness and low alkalinity and containing 442 ppm. $CaCl_2 \cdot 2H_2O$, 120 ppm. $MgSO_4$, 61 ppm. NaCl, 360 ppm. $Na_2SO_4$ and 17 ppm. $NaHCO_3$. In the evaluation, the corrosion inhibitor is added to the indicated concentration and the pH adjusted to 6.5–7.0 with NaOH.

EXAMPLES 1–19

In these examples, corrosion inhibition performance of compositions of this invention (Examples 10–19) is compared to the performance of water-soluble phenolic resins used alone or in combination with zinc salts (Examples 2–9) in short-term tests using the following procedure.

Short-Term Test

The test solution is added to the basin of a recirculating heat-transfer corrosion test loop that consists primarily of a glass basin, a centrifugal pump, a heat-transfer section, and a water condenser, all of which are joined with plasticized polyvinyl chloride tubing. The heat-transfer section is comprised of an outer glass jacket and a mild steel tubular specimen into which a stainless steel cartridge heater is inserted. The test solution is pumped from the basin, through the pump, to the heat-transfer section where it flows through the annular space between the tubular specimen and the glass jacket, and finally through the center of the condenser and back to the basin. The solution is constantly aerated by means of an air sparge in the basin. The flow rate is regulated from zero to 3 gal./min., and the temperature of the test solution is maintained at 55° C.±1° C. by maintaining a constant heat output from the cartridge heater while providing cooling by passing tap water through the outer portion of the condenser. The flow rate of the tap water is regulated utilizing a thermoregulator in the basin. The tubular specimens are polished, degreased, and weighed prior to exposure, then inserted and exposed to the recirculating test solution for 20 hours. In each case, 15.7 in.² of metal surface area is exposed. After exposure, the tubes are removed, dried, weighed, then immersed in 5% sulfuric acid (containing an amine-based corrosion inhibitor) for 3 minutes at 70° C. to remove all scale and corrosion products, dried and reweighed. The difference between the original and final weights is referred to herein as the "weight loss" and is a measurement of the amount of corrosion that the tubular specimen underwent.

The following corrosion inhibitors are used in these examples at concentrations shown in Table I:

SAFR — a salicylic acid-formaldehyde resin prepared from 69 parts salicylic acid (0.5 mole), 47.5 parts of a 37% solution of formaldehyde (0.58 mole), 10 parts water and 0.5 parts of 97% formic acid.

RFR — a resorcinol-formaldehyde resin prepared from 47 parts resorcinol (0.5 mole), 33 parts of a 37% solution of formaldehyde (0.4 mole), 40 parts water and 1 part of 97% formic acid.

MDSA — 5,5'-methylene-disalicylic acid

PPE — phosphorylated polyol prepared from 5 parts polyphosphoric acid (116% $H_3PO_4$) and 1 part pentaerythritol.

Glass H — glassy, linear sodium polyphosphate $Zn^{++}$ — $ZnSO_4 \cdot H_2O$.

TABLE I

| Example | Inhibitor | Concentration | Wt. Loss |
|---|---|---|---|
| Ex. 1 | None (Blank) | — | 1268 mg. |
| Ex. 2 | SAFR | 1000 ppm. | 13 mg. |
| Ex. 3 | SAFR | 500 ppm. | 82 mg. |
| Ex. 4 | SAFR | 100 ppm. | 1099 mg. |
| Ex. 5 | SAFR/$Zn^{++}$ | 100/25 ppm. | 59 mg. |
| Ex. 6 | MDSA | 500 ppm. | 51 mg. |
| Ex. 7 | MDSA | 100 ppm. | 227 mg. |
| Ex. 8 | RFR | 100 ppm. | 874 mg. |
| Ex. 9 | RFR/$Zn^{++}$ | 100/25 ppm. | 90 mg. |
| Ex. 10 | SAFR/Glass H | 50/50 ppm. | 24 mg. |
| Ex. 11 | SAFR/Glass H | 75/25 ppm. | 32 mg. |
| Ex. 12 | SAFR/Glass H | 30/30 ppm. | 33 mg. |
| Ex. 13 | MDSA/Glass H | 50/50 ppm. | 39 mg. |
| Ex. 14 | MDSA/Glass H | 30/30 ppm. | 43 mg. |
| Ex. 15 | RFR/Glass H | 30/30 ppm. | 39 mg. |
| Ex. 16 | SAFR/PPE | 50/50 ppm. | 53 mg. |
| Ex. 17 | SAFR/PPE | 30/30 ppm. | 44 mg. |
| Ex. 18 | MDSA/PPE | 50/50 ppm. | 39 mg. |
| Ex. 19 | MDSA/PPE | 30/30 ppm. | 46 mg. |

EXAMPLES 20–27

These examples illustrate the synergistic results obtained in long-term tests using the corrosion inhibitor compositions of this invention.

Long-Term Test

The same general procedure and apparatus is used as in the short-term test. In these tests an inhibitor dosage five times the maintenance dosage is employed for the first 4 days, then the specified maintenance dosage is utilized for the remaining 10 days of the test period. In the long-term tests the weight loss of the heat-transfer tubular specimens has been converted to corrosion rates in mils per year (mpy). This data is shown in Table II.

TABLE II

| Example | Inhibitor | Maintenance Dosage | Corrosion Rate |
|---|---|---|---|
| Ex. 20 | SAFR | 100 ppm. | 39 mpy (1) |
| Ex. 21 | SAFR/$Zn^{++}$ | 30/5 ppm. | 66 mpy |
| Ex. 22 | SAFR/Glass H | 10/10 ppm. | 1.5 mpy |
| Ex. 23 | SAFR/Glass H | 6/6 ppm. | 0.9 mpy |
| Ex. 24 | MDSA/Glass H | 6/6 ppm. | 0.8 mpy |
| Ex. 25 | SAFR/PPE | 6/6 ppm. | 1.7 mpy |
| Ex. 26 | Glass H | 12 ppm. | 1.9 mpy |
| Ex. 27 | PPE | 12 ppm. | 3.2 mpy |

(1) Test terminated after 7 days due to breakdown of initial corrosion protection

What I claim and desire to be protected by Letters Patent is:

1. A corrosion inhibitor composition for water systems consisting essentially of:
   a. a water-soluble phenolic resin prepared by reacting a phenol having the ortho and/or para position blocked and of the general structural formula

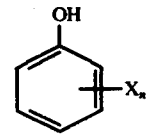

wherein $n$ is 1–3 and each X is in the ortho or para position and is independently selected from the group consisting of —OH, —COOH, hydrogen, —$SO_3H$, —$NH_2$ and alkyl and alkylene radicals which have up to 8 carbon atoms and an aldehyde of the formula

wherein R is selected from the group consisting of hydrogen and lower aliphatic groups having less than 5 carbon atoms; and
   b. a polyphosphate selected from the group consisting of inorganic polyphosphates having a molar ratio of at least one of alkali metal oxide, alkaline earth metal oxide, zinc oxide to $P_2O_5$ of about 0.4/1–2/1, and their corresponding acids having a molar ratio of water to $P_2O_5$ of about 0.4/1–2/1 and polyfunctional acid phosphate esters of a polyhydric alcohol, said esters having the formula R—(O-$PO_3H_2)_x$ wherein R is the organic residue of a polyhydric alcohol and $x$ is a number from 2 to 6.

2. A composition of claim 1 wherein (a) is a water-soluble phenolic resin prepared by reacting salicylic acid with formaldehyde.

3. A composition of claim 1 wherein (a) is a water-soluble phenolic resin prepared by reacting resorcinol with formaldehyde.

4. A composition of claim 1 wherein (b) is a glassy linear sodium polyphosphate.

5. A composition of claim 1 wherein the polyphosphate is a polyfunctional acid phosphate ester of pentaerythritol.

6. Method of conditioning circulating water to reduce the corrosive attack on metal surfaces which the water contacts which comprises introducing into said circulating water a composition consisting essentially of:
   a. a water-soluble phenolic resin prepared by reacting a phenol having the ortho and/or para position blocked and of the general structural formula

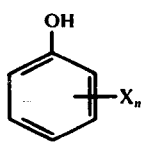

wherein $n$ is 1–3 and each X is in the ortho or para position and is independently selected from the group consisting of —OH, —COOH, hydrogen, —SO$_3$H, —NH$_2$ and alkyl and alkylene radicals which have up to 8 carbon atoms and an aldehyde of the formula

wherein R is selected from the group consisting of hydrogen and lower aliphatic groups having less than 5 carbon atoms; and
   b. a polyphosphate selected from the group consisting of inorganic polyphosphates having a molar ratio of at least one of alkali metal oxide, alkaline earth metal oxide, zinc oxide to P$_2$O$_5$ of about 0.4/1–2/1, and their corresponding acids having a molar ratio of water to P$_2$O$_5$ of about 0.4/1–2/1, and polyfunctional acid phosphate esters of a polyhydric alcohol, said esters having the formula R—(OPO$_3$H$_2$)$_x$ wherein R is the organic residue of a polyhydric alcohol and $x$ is a number from 2 to 6.

7. A method of claim 6 wherein (a) is a water-soluble phenolic resin prepared by reacting salicylic acid with formaldehyde.

8. A method of claim 6 wherein (a) is a water-soluble phenolic resin prepared by reacting resorcinol with formaldehyde.

9. A method of claim 6 wherein (b) is a glassy linear sodium polyphosphate.

10. A method of claim 6 wherein (b) is phosphorylated pentaerythritol.

11. A method of claim 6 wherein the ratio of (a) to (b) is from about 5 to 1 to about 1 to 5.

12. A method of claim 6 wherein the ratio of (a) to (b) is from about 3 to 1 to about 1 to 3.

13. A method of claim 6 wherein the amount of said composition introduced into said water is about 5 to about 100 ppm.

14. A method of claim 6 wherein the amount of said composition introduced into said water is about 10 to about 20 ppm.

* * * * *